United States Patent [19]

Sakai et al.

[11] 4,034,628

[45] July 12, 1977

[54] OIL PRESSURE CONTROL SYSTEM FOR AN AUTOMATIC TRANSMISSION SYSTEM

[75] Inventors: Toshimitsu Sakai, Okazaki; Kagenori Fukumura; Tadashi Saito, both of Toyota, all of Japan

[73] Assignee: Toyota Jidosha Kogyo Kabushiki Kaisha, Toyota, Japan

[21] Appl. No.: 600,138

[22] Filed: July 30, 1975

[30] Foreign Application Priority Data

Apr. 17, 1975 Japan .............................. 50-46701

[51] Int. Cl.² ........................................ B60K 41/18
[52] U.S. Cl. ................................................ 74/869
[58] Field of Search ...................... 74/867, 868, 869

[56] References Cited

U.S. PATENT DOCUMENTS

| | | |
|---|---|---|
| 3,146,630 | 9/1964 | Ivey ........................................ 74/869 |
| 3,613,484 | 10/1971 | Pierce et al. ............................ 74/869 |
| 3,638,771 | 2/1972 | Chana ....................................... 74/869 X |
| 3,651,714 | 3/1972 | Ohya et al. ............................. 74/867 |
| 3,667,323 | 6/1972 | Irie ........................................ 74/868 X |
| 3,688,608 | 9/1972 | Leach ...................................... 74/869 |
| 3,744,348 | 7/1973 | Lemon ..................................... 74/869 |

*Primary Examiner*—Samuel Scott
*Assistant Examiner*—Lance W. Chandler
*Attorney, Agent, or Firm*—Birch, Stewart, Kolasch and Birch

[57] ABSTRACT

An oil pressure control system for an automatic transmission system which includes a fluid torque converter, a transmission gear and friction engaging means adapted to be selectively supplied with line pressure for establishing a selected transmission engagement in said transmission gear, said friction engaging means being provided with a buffering accumulator which buffers its operating pressure, said accumulator comprising a fluid displacing element which is selectively supplied with different levels of oil pressure, preferably a torque converter pressure or a line pressure as a back pressure according to the operational condition of the oil pressure control system.

18 Claims, 5 Drawing Figures

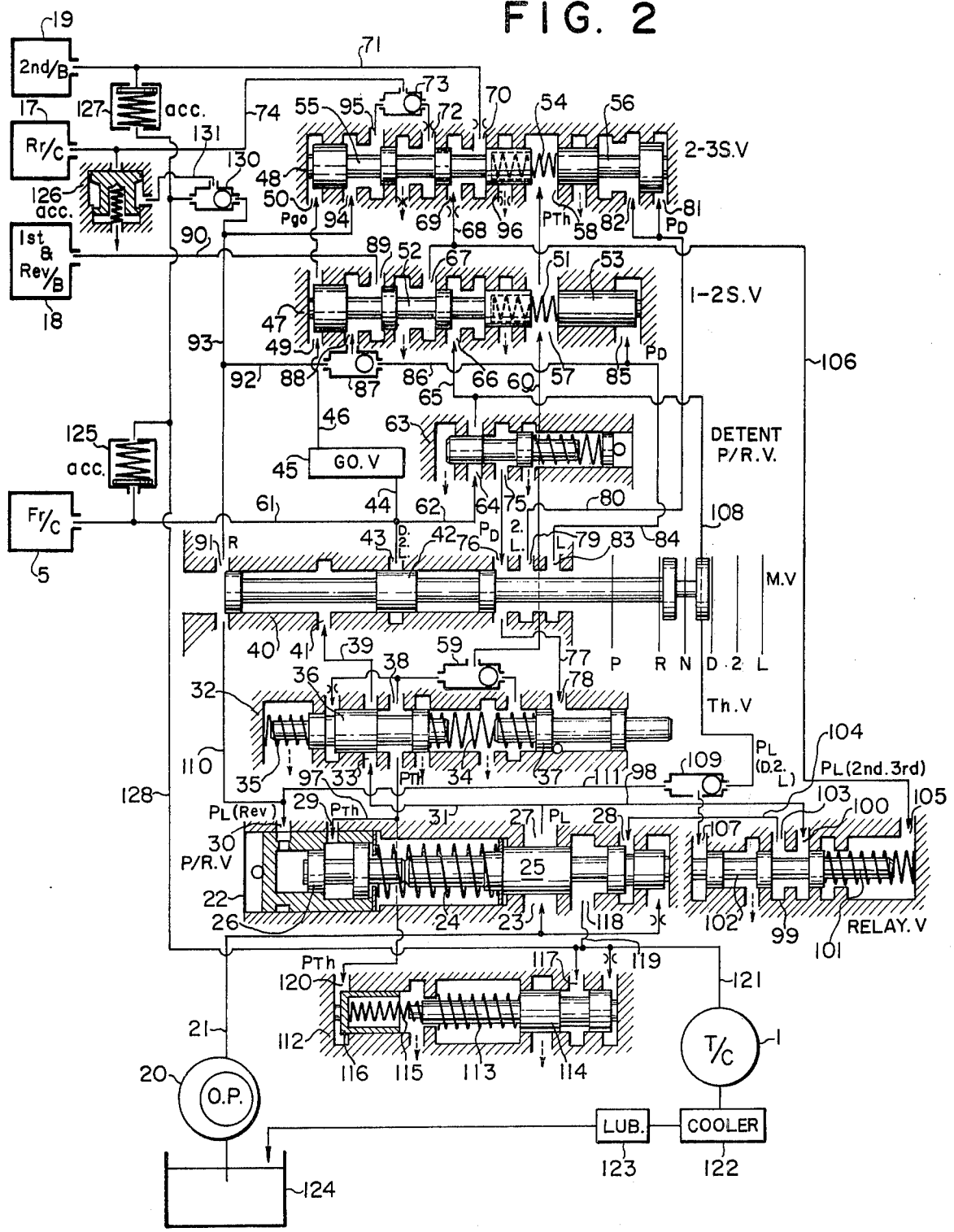

OIL PRESSURE CONTROL SYSTEM FOR AN AUTOMATIC TRANSMISSION SYSTEM

BACKGROUND OF THE INVENTION

1. Field of the invention

The present invention relates to an oil pressure control system for an automatic transmission system for use with automobiles and, more particularly, to an improvement in an oil supply system for a buffering accumulator incorporated in the oil pressure control system for reducing shock caused in speed shifting.

2. Description of the Prior Art

In an automatic transmission for use with automobiles which includes a fluid torque converter, a transmission gear and friction engaging means for establishing a selected transmission engagement in said transmission gear and is adapted to be controlled by an oil pressure control system, an accumulator is generally provided in an oil pressure circuit for operating said friction engaging means in order to accomplish a smooth changing over of the automatic transmission system by reducing the shock which is caused by the engagement of the friction engaging means. An accumulator for the abovementioned purpose conventionally comprises a fluid displacing element such a cylinder-piston means wherein the piston is flexibly supported by a spring means which counteracts the oil pressure existing in the oil pressure circuit for operating the friction engaging means. Furthermore, it is known to supply an oil pressure generated in the oil pressure control system to said cylinder-piston means as a back pressure for the piston in order to control the stiffness of the buffering accumulator. However, since a particular friction engaging means such as the rear clutch is engaged in a plurality of operating conditions, i.e. D Range the highest speed (usually 3rd speed) condition as well as R Range, the back pressure supplied to the cylinder-piston type buffering accumulator which is adjusted to provide favourable stiffness in an operating condition will not be proper for the other operating condition. Generally, a higher stiffness of the buffering accumulator is favourable for R Range when compared with D Range the highest speed shifting condition. Conventionally, the line pressure generated in the oil pressure control system has been mostly employed as the back pressure for the accumulator. Since the line pressure is usually raised or lowered according to increase or decrease of the torque to be transmitted by the transmission system, it becomes higher in R Range than in D Range the highest speed shifting condition. Therefore, this performance has generally conformed to the requirement with regard to the stiffness of the buffering accumulator. However, for the modern oil pressure control system, it is required that the stiffness of the buffering accumulator is more delicately controlled as precisely adapted to the throttle opening so that the shock in the shifting be further reduced. To meet with this requirement, it has been proposed to generate a particular oil pressure by a valve means for use as the back pressure for the accumulator instead of the conventional line pressure. However, such a system is still bound with the drawback that the back pressure is not adjusted for the change of the shifting condition like the change between R Range and D Range 3rd speed, thereby making it difficult to obtain favourable shock reducing performance in all shifting ranges.

SUMMARY OF THE INVENTION

Therefore, the object of the present invention is to provide an improved oil pressure control system for an automatic transmission system for use with automobiles wherein the buffering means for friction engaging means is automatically adjusted for the most favourable shock absorbing condition in every operational condition of the oil pressure control system.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the above-mentioned object is accomplished by providing an oil pressure control system for an automatic transmission system which includes a fluid torque converter, a transmission gear and friction engaging means for establishing a selected transmission engagement in said transmission gear, comprising; a source of oil pressure; a line pressure regulating valve which generates a regulated line pressure from the oil pressure of said source; a throttle pressure regulating valve which generates a throttle pressure from said line pressure, said throttle pressure increasing as a throttle valve is opened; a governor pressure regulating valve which generates a governor pressure from said line pressure, said governor pressure increasing as the vehicle speed increases; a plurality of speed shift valves which are shifted due to a balance between said governor pressure and said throttle pressure so as to supply oil pressure to a selected element or elements of said friction engaging means; a manual shift valve which is operated by hand to supply oil pressure to a particular element or elements of said friction engaging means and apply a restriction to a selected one of said shift valves; a buffering accumulator for an element of said friction engaging means, said accumulator comprising a fluid displacing element which is supplied with oil pressure as a back pressure; a back pressure regulating valve which generates a second oil pressure from said line pressure; and a switch-over valve which selects one of several oil pressure sources in said oil pressure control system according to the operational condition of said system so as to supply oil pressure of a selected source to said fluid displacing element.

BRIEF DESCRIPTION OF THE DRAWING

The present invention will become more fullly understood from the detailed description given hereinbelow and the accompanying drawings which are given by way of illustration only, and thus are not limitative of the present invention, and wherein.

FIG. 2 is a diagrammatical view showing the oil pressure control system for controlling the automatic transmission system shown in FIG. 1;

DESCRIPTION OF THE PREFERRED EMBODIMENT

Figure 1:
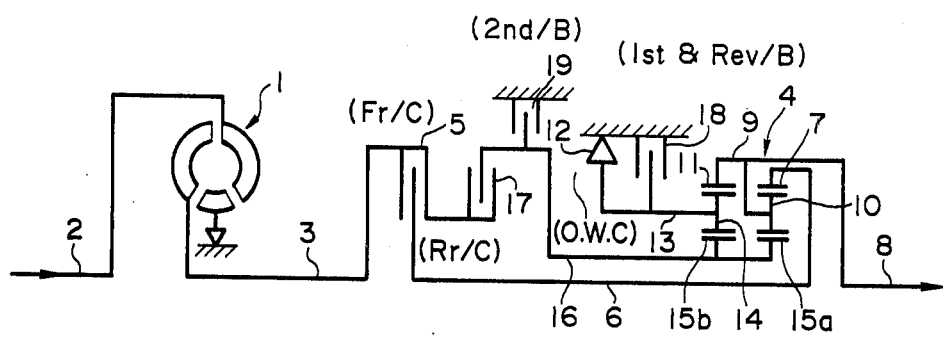
FIG. 1 is a diagrammatical view showing an example of the automatic transmission system for use with automobiles which includes a fluid torque converter, a transmission gear and friction engaging means for establishing a selected transmission engagement in said transmission gear.

Referring to FIG. 1, there is a diagrammatically shown automatic transmission system which comprises a fluid torque converter, a transmission gear and friction engaging means for establishing a selected transmission engagement in said transmission gear. Reference numeral 1 designates the fluid torque converter which itself is well known, having an input shaft 2 and an output shaft 3. The input shaft 2 is sometimes called a pump shaft and is directly connected to an output shaft of an engine (not shown) or normally a crank shaft. The output shaft 3 is sometimes called a turbine shaft and is directly connected to an input member of a front clutch 5 of a succeeding transmission gear 4. The output member of the front clutch 5 is carried by a first intermediate shaft 6 which, in turn, carries a ring gear 7. The ring gear 7 meshes with rear planetary pinions 10 (only one is shown in FIG. 1) which are carried by a carried 9 supported by an output shaft 8 of the transmission gear. The carrier 9 supports another ring gear 11 which meshes with front planetary pinions 14 (only one is shown in FIG. 1) which are carried by a carrier 13 which in turn, is supported by a one-way clutch 12 to be rotatable only in one direction. Meshing with the planetary pinions 10 and 14, sun gears 15a and 15b are supported by a second intermediate shaft 16 which is rotatable co-axially with said first intermediate shaft 6. The driving member of the front clutch 5 is extended to form a driving member of a rear clutch 17, a driven member of which is formed as a unitary body as said intermediate shaft 16. The rotation of the carrier 13 can be braked by a first-reverse brake 18. The rotation of the second intermediate shaft 16 can be braked by a second-brake 19.

The transmission gear having the aforementioned constitution operates as follows:

D Range, 1st speed . . . The front clutch 5 is engaged. Thus, the rotation of the clutch (designated as clockwise rotation) is transmitted to the ring gear 7 through the first intermediate shaft 6, thereby driving the rear planetary pinions 10 clockwise. the sun gear 15a is therefore driven anticlockwise by the planetary pinions, applying, in turn, a rotational force to the front planetary pinions 14. Thus, the front planetary pinions and the carrier 13 which carries the pinions are applied with a rotational driving force in anticlockwise direction. However, since the rotation is prevented by the one-way clutch 12, the carrier 9 is driven in clockwise direction, thus driving the output shaft 8 in clockwise direction.

D range, 2nd speed . . . The front clutch is engaged, and the second brake 19 is actuated. The rotation of the turbine shaft 3 is transmitted to the ring gear 7 through the first intermediate shaft 6, thereby driving the rear planetary pinions 10 in clockwise direction. Since, in this case, the sun gear 15a and the second intermediate shaft 16, both being a unitary member, are restricted by the second brake 19, the planetary pinions 10 are driven around the sun gear 15a, whereby the carrier 9 which carries said planetary pinions is driven in clockwise direction, thus driving the putput shaft 8 in the same direction.

D Range, 3rd speed . . . The front clutch 5 and the rear clutch 17 are engaged. The intermediate shaft 6 and the sun gears 15a,15b or the intermediate shaft 16 then rotate as a unitary body, rendering the planetary gear mechanism inoperable. Therefore, the carrier 9 and the output shaft 8 rotate together with the turbine shaft 3 as a unitary body without effecting any reduction in speed.

R (Reverse) range . . . The rear clutch 17 is engaged, and the reverse brake 18 is actuated. The clockwise rotation of the turbine shaft 3 is transmitted to the sun gear 15b through the intermediate shaft 16, applying a rotational driving force to the front planetary pinions 14 to rotate same clockwise around the sun gear 15b. However, since the rotation is prevented by the reverse brake 18, the front planetary pinions 14 are rotated anticlockwise around their axis, whereby the carrier 9 and the output shaft 8 are rotated anticlockwise through the ring gear 11.

L Range (locked at forward 1st speed) . . . The front clutch is engaged, and the the first-brake 18 is actuated. This range is the same D Range, 1st speed in the engine drive condition, wherein the driving force is transmitted from the turbine shaft 3 to the output shaft 8. However, by contrast to D Range, 1st speed, wherein the driving force cannot be transmitted from the ouput shaft 8 to the turbine shaft 3 as in the engine brake condition due to slippage of the one-way clutch 12, L Range allows for the transmission of the driving force from the output shaft 8 to the turbine shaft 3.

FIG. 2 is a diagram of an oil pressure control system incorporating the present invention for actuating the aforementioned front clutch 5, rear clutch 17, first-reverse brake 18 and second brake 19 in various combinations as mentioned above to accomplish a required operational range. In the figure, 20 designates an oil pump which generates an oil pressure which is delivered through a passage 21 to a port 23 of a line pressure regulating vavle 22. The valve 22 includes a valve member 25 urged rightward in the figure by a coil spring 24 and another valve member which abuts against end of the valve member 25. A line pressure is delivered from a port 27 of the valve 22, said line pressure being regulated at a predetermined level by control pressures which are applied to ports 28, 29 and 30 in a manner explained hereinunder. The line pressure delivered from the port 27 is transmitted through a passage 31 to a port 33 of a throttle pressure regulating valve 32. The valve 32 comprises a valve member 36 maintained by the balance of compression coil springs 34 and 35 and another valve member 37 which suppports one end of the spring 34. The valve member 37 is applied with a leftward compression force at its right end according to the opening of a throttle valve of a carburetor (not shown) or the pressing of an accelerating pedal. Thus, a port 38 of the regulating valve 32 delivers a throttle pressure which is modulated from the line pressure according to the throttle opening. On the other hand, the line pressure passes through the port 33 of the regulating valve 32 and is transmitted through a passage 39 to a port 41 of a manual control valve 40. The valve 40 comprises a valve member 42 which is shifted among positions P, R, N, D, 2 and L as shown in the figure by a change lever (not shown). A port 43 of the manual control valve 40 is supplied with the line pressure when the valve member 42 is shifted to positions D, 2 and L, said line pressure being transmitted through a passage 44 to a governor pressure regulating valve 45. The regulating valve 45 generates a governor pressure which increases according to the vehicle speed. The governor pressure is transmitted through a passage 46 to left end ports 49 and 50 of 1-2 speed shift valve 47 and 2.3 speed shift valve 48, respectively. The 1-2 speed shift valve 47 comprises a valve member 52 urged leftward by a compression coil spring 51 and a valve member 53 which supports a right end of the spring 51. The 2-3 speed shift valve 48 comprises a valve member 55 urged leftward by a compression coil spring 54 and another valve member 56 which supports a right end of the spring 54. A port 57 of the 1-2 speed shift valve 47 and a port 58 of the 2-3 speed shift valve 48 are supplied with the throttle pressure delivered from the port 38 of the throttle pressure regulating valve 32 through a switching element 59 and a passage 60. The valve member 52 in the 1-2 speed shift valve 47 is subjected to a balance between the governor pressure and the throttle pressure applied to the ports 49 and 57, respectively, and is shifted rightward while compressng the compression coil spring 51 when the governor pressure has risen beyond a predetermined level in relation to the throttle pressure. Similarly, the valve member 55 in the 2-3 speed shift valve 48 is subjected to a balance between the governor pressure and the throttle pressure applied to the port 50 and 58 respectively, and is shifted rightward while compressing the compression coil spring 54 when the governor pressure has risen beyond a predetermined level in relation to the throttle pressure, said level being higher than the first mentioned predetermined level which is determined for the 1-2 speed shift valve.

On the other hand, the line pressure delivered from the port 43 of the manual shift valve 40 is transmitted through a passage 61 to the front clutch 5, while, simultaneously, it is transmitted through a passage 62 to a port 64 of a detent pressure regulating valve 63 and, furthermore, it is transmitted through a passage 65 to a port 66 of the 1-2 speed shift valve. The line pressure supplied to the port 66 appears at a port 67 of the speed shift valve when the valve member 52 is shifted rightward and is transmitted through a passage 68 to a port 69 of the 2-3 speed shift valve 48. The line pressure supplied to the port 69 appears at a port 70 of the shift valve when the valve member 55 is shifted leftward as shown in the figure, and is transmitted through a passage 71 to a second brake 19. The line pressure supplied to the port 69 of the 2-3 speed shift valve 488 appears at a port 72 of the speed shift valve when the valve member 55 is shifted rightward and is transmitted through a switching element 73 and a passsage 74 to the rear clutch 17.

The detent pressure regulating valve 63 generates a predetermined detent pressure at its port 75, said detent pressure being supplied to a port 76 of the manual shift valve 40 wherefrom it is transmitted through a passage 77 to a port 78 of the throttle pressure regulating valve 32; through a port 79 and a passage 80 to ports 81 and 82 of the 2-3 speed shift valve 48 and/or through a port 83 and a passage 84 to a port 85 of the 1-2 speed shift valve 47 and, furthermore, through a passage 86 and a switching element 87 to a port 88 of the 1-2 speed shift valve. The oil pressure supplied to the port 88 appears at a port 89 of the speed shift valve when the valve member 52 is shifted leftward as shown in the figure, and is transmitted through a passage 90 to the first-reverse brake 18.

The manual shift valve 40 is provided with a reverse port 91. When the valve member 42 is shifted to R (reverse) position, the line pressure supplied to the port 41 of the manual shift valve appears at the port 91, wherefrom the line pressure is transmitted through a passage 92 and the switching element 87 to the port 88 of the 1-2 speed shift valve, and simultaneously, transmitted through a passage 93 to a port 94 of the 2-3 speed shift valve. The line pressure supplied to the port 94 appears at a port 95 of the shift valve member 55 is shifted leftward as shown in the figure and is transmitted through the switching element 73 and the passage 74 to the rear clutch 17.

For the respective transmission ranges, the above-mentioned oil pressure control system operates as follows:

D Range . . . The manual shift valve 40 is shifted to D position, whereby its ports 43 and 76 are opened while the subsequent ports 79 and 83 are still closed. Thus, the line pressure is transmitted from the port 43 through the passage 62 to the front clutch 5; through the passage 44 to the governor pressure regulating valve 45; and through the passage 62 to the port 64 of the detent pressure regulating valve 63 and, furthermore, through the passage 65 to the port 66 of the 1-2 speed shift valve 47. In this condition, when the accelerating pedal is pressed to start the automobile, the throttle valve is opened, the engine gradually increases its output power, the automobile starts, and its speed gradually increases. Accordingly, the governor pressure generated by the governor pressure regulating valve 45 gradually increases. On the other hand, according to the opening of the throttle valve, the valve member 37 of the throttle pressure regulating valve 32 is applied with a certain level of leftward pressure and applies, in turn, an increased pressure to the valve member 36 via the spring 34, thereby causing an increase in the throttle pressure which appears at the port 38. When the vehicle speed is below a predetermined level so that the governor pressure generated in the passage 46 is below a predetermined level in relation to the throttle pressure supplied to the passage 60, the valve member 52 of the 1-2 speed shift valve 47 and the valve member 55 of the 2-3 speed shift valve 48 are both maintained at their leftward shift positions as shwon in the figure. Therefore, the front clutch 5 alone is engaged, establishing D Range, 1st speed. If the vehicle speed futher increases so that the governor pressure in the passage 46 exceeds the aforementioned predetermined level, the valve member 52 of the 1-2 speed shift valve 47 is shifted rightward. Then, the line pressure supplied to the port 66 is transmitted through the port 67 and the passage 68 to the port 69 of the 2-3 speed shift valve 48, wherefrom it is transmitted through the port 70 and the passage 71 to the second brake 19 to actuate same. In this condition, therefore, D Range, 2nd speed is accomplished. If the vehicle speed further increases so that the governor pressure in the passage 46 increases beyond a second predetermined level, the valve member 55 of the 2-3 speed shift valve 48 is shifted rightward. Then, the line pressure supplied to the port 69 of the shift valve is transmitted through the port 72, the switching element 73 and the passage 74 to the rear clutch 17. In this condition, therefore, D Range, 3rd speed is accomplished. At this time, the oil pressure which has been supplied to the second brake 19 is drained through a port 96 of the 2-3 speed shift valve. To the contrary, when the vehicle speed gradually decreases, the 2-3 speed shift valve and the 1-2 speed shift valve are successively shifted in the reversed order. In this case, the 1-2 speed shift vale and the 2-3 speed shift valve are adapted to have a hysterisis regarding the balance of the shifting point oil pressure in order to provide stability in operation in the vicinity of the shifting point.

2 Range ... The manual shift valve 40 is shifted to 2 position. In this condition, the ports 43, 76 and 79 of the manual shift valve are opened. By the port 79 being opened, the detent pressure delivered from the port 75 of the detent pressure regulating valve 63 is transmitted through the port 79 and the passage 80 to the ports 81 and 82 of the 2-3 speed shift valve 48. Therefore, the valve member 56 is shifted leftward and forcibly maintains the valve member 55 at the leftward shift position as shown in the figure. In this condition, therefore, shifting to D Range, 3rd speed is prohibited and the transmission is operated within the range of 1st speed and 2nd speed.

L Range ... The manual shift valve 40 is shifted to L position. In this condition, the ports 43, 76, 79 and 83 are opened. Therefore, the line pressure is further transmitted through the port 83 and the passage 84 to the port 85 of the 1-2 speed shift valve 47. Due to this oil pressure, the valve member 53 is shifted leftward and forcibly maintains the valve member 52 at the leftward shift position as shown in the figure. Furthermore, the line pressure supplied to the passage 84 is transmitted through the passage 86 and the switching element 87 to the port 88, wherefrom it is transmitted through the port 89 and the passage 90 to the first-reverse brake 18. Since at this time the valve member 55 of the 2-3 speed shift valve 48 is also forcibly maintained at its leftward shift position as shown in the figure, the front clutch 5 and the first-reverse brake 18 are actuated thereby accomplishing L Range.

N Range ... The manual shift valve 40 is shifted to N position as shown in the figure. In this condition, the line pressure does not appear at the port 43 and, accordingly, neither clutches nor brakes are actuated. The transmission gear of course does not transmit any driving power.

R Range ... The manual shift valve 40 is shifted to R position. The line pressure appears at the reverse port 91, wherefrom it is transmitted through the passage 93, ports 94 and 95 of the 2-3 speed shift valve 48, switching element 73 and the passage 74 to the rear clutch 17. Simultaneously, the line pressure is transmitted through the passage 72, switching element 87, ports 88 and 89 of the 1-2 speed shift valve 47 and passage 90 to the first-reverse brake 18 to actuate same.

P Range ... The manual shift valve 40 is shifted to P position. In this condition, the port 41 of the manual shift valve is blocked. Therefore, the line pressure is not transmitted to any succeeding portions in the oil pressure control system. The transmission gear of course does not transmit any driving power.

The line pressure which is employed to accomplish the aforementioned various shifting operations is regulated by the line pressure regulating valve 22 in the below mentioned manner to be modulated according to the shifting ranges and the throttle opening. The port 29 of the line pressure regulating valve 22 is supplied with the throttle pressure which is delivered from the port 38 of the throttle pressure regulating valve 32 and transmitted through the passage 97. This throttle pressure acts to exert a rightward force to the valve member 25 of the line pressure regulating valve, thereby effecting an increase of the line pressure according to the opening of the throttle valve. The line pressure delivered from the port 27 of the line pressure regulating valve is transmitted through a passage 98 to a port 100 of a relay valve 99. This relay valve comprises a valve member 102 urged leftward by a spring 101. When the valve member 102 is shifted leftward as shown in the figure, the line pressure supplied to the port 100 is transmitted through a port 103 and a passage 104 to the port 28 of the line pressure regulating valve. The line pressure supplied to the port 28 acts to urge the valve member 25 leftward, thereby effecting a reduction of the line pressure when compared with the condition wherein the line pressure is not applied to the port 28. A port 105 of the relay valve 99 is supplied with the line pressure which appears at the port 67 of the 1-2 speed shift valve 47 through a passage 106. A port 107 of the relay valve is supplied with either the line pressure which appears at the port 64 of the detent pressure regulating valve 63 through a passage 108 and a switching element 109 or the line pressure which appears at the reverse port 91 of the manual shift valve 40 through a passage 110, 111 and the switching element 109. The port 30 of the line pressure regulating valve 22 is supplied with the line pressure which appears at the reverse port 91 of the manual shift valve through the passage 110. The line pressure supplied to the port 30 acts to exert the valve member 26 rightward, thereby effecting an increase of the line pressure when compared with the condition wherein the line pressure is not applied to the port 30.

Due to the abovementioned constitution, when the manual shift valve 40 is shifted to R Range, the line pressure is transmitted from its reverse port 91 through the passage 110 to the port 30 of the line pressure regulating valve. At this time, the line pressure supplied through the passage 110 is further transmitted through the passage 111 and the switching element 109 to the port 107 of the relay valve 99. Since at this time, the port 105 of the relay valve is not supplied with line pressure, the line pressure supplied to the port 107 shifts the valve member 102 rightward, thereby intercepting connection between the ports 100 and 103, whereby the port 28 of the line pressure regulating valve is not supplied with the line pressure. In this condition, therefore, the line pressure becomes the highest.

When the manual shift valve 40 is shifted to either of D, 2 and L Ranges, and the shifting condition of the 1-2 speed shift valve and the 2-3 speed shift valve is in the 1st speed condition, the line pressure does not appear at the reverse port 91 of the manual shift valve. Therefore, the port 30 of the line pressure regulating valve is not supplied with the line pressure. Since in this condition the valve member 52 of the 1-2 speed shift valve 47 is maintained at its leftward shift position as shown in the figure, the line pressure supplied to its port 66 is not transmitted to the port 67. The line pressure which appears at the port 66 is transmitted through the passage 108 and the switching element 109 to the port 107 of the relay valve 99, whereby the valve member 102 of the relay valve is shifted rightward while compressing the spring 101 like in the aforementioned R Range and intercepts the connection between the ports 100 and 103. In this condition, therefore, the port 28 of the line pressure regulating valve 22 is not supplied with the line pressure, resulting in a lower level of the line pressure when compared to that in the aforementioned R Range.

When the manual shift valve 40 is shifted to P, N, D, 2 or L Range, the line pressure does not appear at the reverse port 91 of the manual shift valve. Therefore, the port 30 of the line pressure regulating valve is not supplied with the line pressure. Furthermore, when the manual shift valve is shifted to P or N range, the port 107 of the relay valve 99 is not supplied with the line pressure. If the 2nd or 3rd speed range is attained with the valve member 52 of the 1-2 speed shift valve 47 being shifted rightward, both of the ports 107 and 105 are supplied with the line pressure. Therefore, in either condition the valve member 102 of the relay valve is maintained at its leftward shift position as shown in the figure by the action of the spring 101. Therefore, the port 28 of the line pressure regulating valve is supplied with the line pressure, effecting a further reduction of the line pressure when compared with the aforementioned 1st speed condition.

Figure 3:
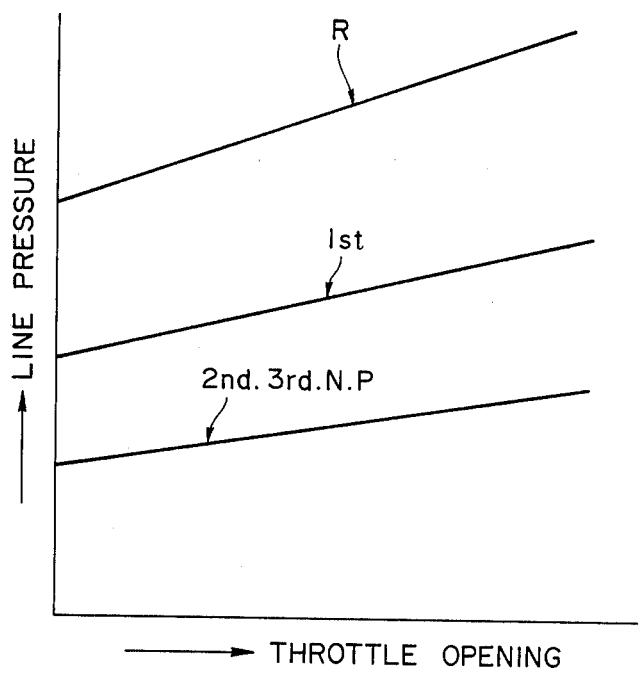
FIG. 3 is a graph which shows the performance of the line pressure obtained in the oil pressure control system shown in FIG. 2 in relation to the throttle opening; and, FIG. 4 is a graph which shows the performance of the torque converter pressure obtained in the oil pressure control system shown in FIG. 2 in relation to the throttle opening.

The aforementioned performances of the line pressure regulated by the line pressure regulating valve are shown in FIG. 3.

Figure 4:
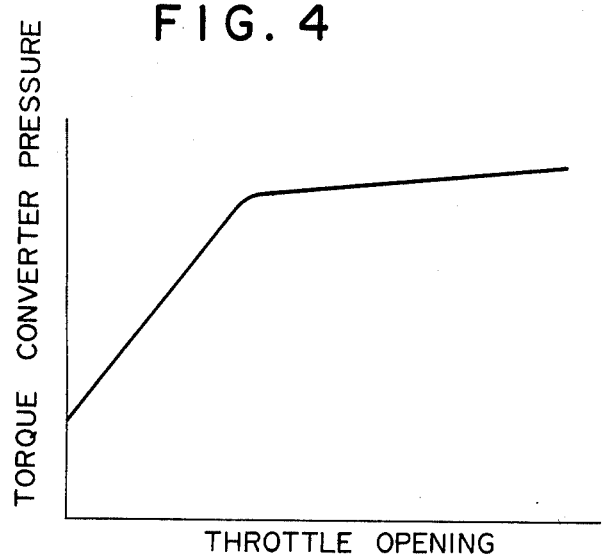

Element 112 designates a back pressure or torque converter pressure regulating valve which comprises a valve member 114 urged rightward by a compression coil spring 113, a left end of said valve member being supported by a compression coil spring 115 which, in turn, is supported by a cup-like valve member 116 at its left end. A port 117 of the regulating valve 112 is supplied with oil pressure which appears at a relief port 118 of the line pressure regulating valve 22 through a passage 119. By this arrangement, the pressure in the passage 119 is regulated by the regulating valve 112 at a second predetermined level, different from the line pressure, this second oil pressure being herein referred to as torque converter pressure. A port 120 of the regulating valve 112 is supplied with the throttle pressure which appears at the port 38 of the throttle pressure regulating valve 32, said throttle pressure acting to urge the valve member 114 rightward via the spring 115 thereby effecting an increase of the oil pressure in the passage 119 or the torque converter pressure according to increase of the throttle pressure. This increase of the torque converter pressure due to increase of the throttle pressure is effected until the valve member 116 reaches the terminal position in its rightward shifting. Thereafter, the rightward pressure applied to the valve member 14 becomes constant, whereby the torque converter pressure generated in the passage 119 becomes constant. The performance of the torque converter pressure controlled by the torque converter pressure regulating valve according to the throttle opening in the aforementioned manner is shown in FIG. 4.

The torque converter pressure generated in the passage 119 is supplied through a passage 121 to the torque converter 1, wherefrom the oil is passed through an oil cooler 122 to be effected cooling and, after being passed through lubricating portions 123, is returned to an oil tank 124.

The front clutch 5, the rear clutch 17 and the second brake 19 are provided with accumulators 125, 126 and 127, respectively, to accomplish smooth engaging operation by reducing shock caused by abrupt engagement or actuation thereof. The accumulators 125 and 127 for the front clutch 5 and the second brake 19 are constantly supplied with the torque converter pressure through a passage 128 as their back pressure, while the accumulator 126 for the rear clutch 17 is supplied with either of the torque converter pressure in the passage 128 or the line pressure according to the switching-over operation of the switch-over element 130, said line pressure being obtained from the passage 93 extending from the reverse port 91 of the manual shift valve 40.

Figure 5:
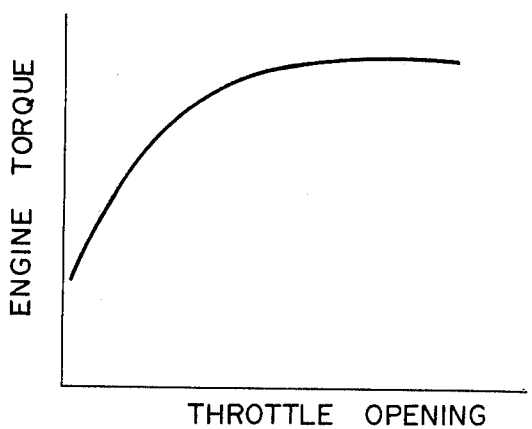
FIG. 5 is a graph which shows engine torque variance in relation to the throttle opening.

It is generally favourable that the buffering performance of the accumulators or their stiffness increases as the engine torque increases. The engine torque varies according to the throttle opening in a manner as shown in FIG. 5. Therefore, comparing FIG. 5 with FIG. 4, it will be noted that the manner of change of the engine torque in relation to the throttle opening resembles that of the change of the torque converter pressure in relation to the throttle opening. Therefore, the accumulators 125 and 127 for the front clutch 5 and the second brake 19, which are supplied with the torque converter pressure as the back pressure are automatically controlled of their stiffness in a favourable manner as adapted to the operation of the engine.

As for the accumulator 126 for the rear clutch 17, it is noted that since the line pressure does not appear at the reverse port 91 of the manual shift valve 40 in D Range, 3rd speed range, the accumulator 126 is, in this range, supplied with the torque converter pressure from the passage 128 through the switch-over element 130 and the passage 131, whereby the accumulator operates with a stiffness which is adapted for shifting to D Range, 3rd speed based upon the torque converter pressure as the back pressure. By contrast, when the manual shift valve 40 is shifted to R Range with its valve member 42 being set at R position, the line pressure appears at the reverse port 91, said line pressure being introduced into the switch-over element 130 through the passage 93. Them, the line pressure which is higher than the torque converter pressure effects switching-over of the switch-over element 130, interrupting supply of the torque converter pressure to the switch-over element 130 while introducing itself through the switch-over element 130 and the passage 131 to the accumulator 126. Thus, the accumulator 126 is now supplied with back pressure which is higher than that supplied in D Range, 3rd speed condition thereby providing an increased stiffness for the shock absorbing operation adapted for shifting to R Range.

From the foregoing, it will be appreciated that the accumulator which operates in different manner of establishing transmission in an automobile transmission system is selectively supplied with different levels of oil pressure according to its operation conditions, thereby accomplishing the most favourable shock absorbing performance in every shifting condition.

We claim:

1. An oil pressure control system for an automobile transmission system which includes a fluid torque converter, a transmission gear and friction engaging means for establishing a selected transmission engagement in said transmission gear, comprising:
    a source of oil pressure;
    a line pressure regulating valve which generates a regulated line pressure from the oil pressure of said source;

a throttle pressure regulating valve which generates a throttle pressure from said line pressure, said throttle pressure increasing as a throttle valve is opened;

a governor pressure regulating valve which generates a governor pressure from said line pressure, said governor pressure increasing as the vehicle speed increases;

a plurality of speed shift valves which are shifted due to a balance between said governor pressure and said throttle pressure so as to supply oil pressure to a selected element or elements in said friction engaging means;

a manual shift valve which is operated by hand to supply oil pressure to a particular element or elements of said friction engaging means and applying a restriction to a selected one of said speed shift valves;

a buffering accumulator for an element of said friction engaging means, said accumulator comprising a fluid displacing element which is supplied with oil pressure as a back pressure;

a back pressure regulating valve which generates a second oil pressure from said line pressure, said second pressure being lower than said line pressure and modified to vary in accordance with said throttle pressure; and a switch-over valve adapted to deliver an output pressure to said buffering accumulator, said output pressure being a higher one of the two input pressures supplied thereto, wherein one of said two input pressures is said second pressure and the other of said two input pressures is either zero or said line pressure which appears at a port of said manual shift valve in accordance with the shifting of said manual shift valve.

2. An oil pressure control system according to claim 1, wherein said switch-over valve is a three-ported ball check valve comprising a housing having a first port to be supplied with said line pressure, a second port to be supplied with said torque converter pressure and a third port connected to said buffering accumulator, and a ball mounted in said housing to be movable between first and second positions, said ball connecting said first and third ports while isolating said third port from said second port when it is located in said first position and connecting said second and third ports while isolating said third port from said second port when it is located in said second position.

3. An oil pressure control system according to claim 1, wherein said transmission gear includes a plurality of planetary gear mechanisms, each comprising planetary gear components such as a sun gear, a ring gear, a plurality of planetary pinions and said friction engaging means includes a plurality of clutches and brakes, comprising;

a front clutch adapted to connect an input power shaft to one component of said planetary gear mechanisms;

a rear clutch adapted to connect said input power shaft to a further component of said planetary gear mechanisms;

a first-reverse brake adapted to brake an additional component of said planetary gear mechanisms; and a second brake adapted to brake said further component of said planetary gear mechanisms.

4. An oil pressure control system according to claim 3, wherein said transmission gear provides for three speed forward drive transmissions and a reverse drive transmission; said clutches include a front clutch, said rear clutch and said one-way clutch, and said brakes include said first-reverse brake and said second brake, wherein said front clutch and said first-reverse brake and/or said one-way clutch are actuated for first speed transmission; said front clutch and said second brake are actuated for second speed transmission; said front and rear clutches are actuated for third speed transmission; and said rear clutch and said first-reverse brake are actuated for reverse drive transmission.

5. An oil pressure control system according to claim 4, wherein said clutch is provided with said buffering accumulator.

6. An oil pressure control system according to claim 5, wherein said front clutch and said second brake are provided with other buffering accumulators, each comprising a fluid displacing element which is constantly supplied with said second oil pressure as its back pressure.

7. An oil pressure control system according to claim 6, wherein said second oil pressure is also supplied to fluid torque converter as a torque converter pressure.

8. An oil pressure control system according to claim 4, wherein said switch-over valve selects either said second pressure of the line pressure which appears at a reverse port of said manual shift valve when said manual shift valve is shifted to R Range.

9. An oil pressure control system according to claim 1, wherein said back pressure regulating valve comprises a valve member which controls a release port for said second oil pressure, said valve member being basically positioned by a balance between said second oil pressure which acts to urge said valve member in a first direction to open said release port and a spring force which acts to urge said valve member in a second direction opposite to said first direction, said valve member being further applied with a second spring force which acts to urge said valve member in said second direction, said second spring force being applied with a compression spring which is supported by a piston member at its one end, said piston member being applied with the throttle pressure which acts to bias said piston member in a direction to compress said compression spring for increasing said second spring force, a stroke of said biasing of said piston member being limited by the piston member abutting against a positive stopper.

10. An oil pressure control system according to claim 9, wherein said piston member and said compression spring being designed so that the biasing stroke of said piston member is fully traversed when the throttle pressure has risen to a level which is attained by said throttle pressure regulating valve when the throttle valve is opened to an opening at which the engine torque substantually saturates.

11. An oil pressure control system according to claim 1, wherein said line pressure regulating valve provides for three substantially different line pressure levels according to the shifting conditions of said plurality of speed shift valves and said manual shift valve, the line pressure being at a highest level when said manual shift valve is shifted to R Range, an intermediate level when said manual shift valve is shifted to D, 2 or L Range and said speed shift valves are shifted to establish 1st speed transmission, and a lowest level in other shifting conditions.

12. An oil pressure control system according to claim 11, wherein said line pressure regulating valve comprises a valve member which controls a release port for said line pressure, said valve member being basically positioned by a balance between said line pressure which acts to urge said valve member in a first direction to open said release port and a spring force which acts to urge said valve member in a second direction opposite to said first direction, said valve member being further selectively applied with said line pressure in said first direction, the throttle pressure in said second direction and said line pressure in said second direction according to the shifting conditions of said plurality of speed shift valves and said manual shift valve.

13. An oil pressure control system according to claim 12, wherein said second line pressure applied to said valve member in said first direction is controlled by a relay valve which is controlled by the shifting of said plurality of shift valves and said manual shift valve.

14. An oil pressure control system according to claim 13, wherein said relay valve comprises a valve member biased in a first direction by a compression spring, said relay valve having two ports which communicate to each other and transmit the line pressure which is applied to the valve member of said line pressure regulating valve when the valve member of said relay valve is biased in said first direction, the valve member of said relay valve being selectively applied with the line pressure at opposite ends thereof in a manner that when the shifting condition of said manual shift valve and said plurality of shift valve is established to obtain 1st speed transmission, the valve member of said relay valve is applied with the line pressure at its one end so as to be shifted in a second direction opposite to said first direction thereby intercepting transmission of the line pressure through said two ports while in other shifting conditions, the valve member of said relay valve is either not applied with any line pressure at opposite ends thereof or applied with the line pressure at opposite ends thereof.

15. An oil pressure control system according to claim 14, wherein said line pressure which is selectively applied to the valve member of said line pressure regulating valve in said second direction is controlled by a reverse port of said manual shift valve so that said line pressure is applied when said manual shift valve is shifted to R Range.

16. An oil pressure control system according to claim 1, wherein said throttle pressure regulating valve comprises a valve member which controls a release port for the line pressure, said release port generating said throttle pressure, said valve member being basically positioned by a balance between the throttle pressure which acts to urge said valve member in a first direction to close said release port and a spring force which acts to urge said valve member in a second direction opposite to said first direction, said spring force being adapted to be increased according to increase of throttle valve opening.

17. An oil pressure control system according to claim 16, wherein said spring force is applied by a compression spring which is supported by a piston member at one end thereof, said piston member being displaced by a throttle valve operating mechanism to compress said spring according to increase of the throttle valve opening.

18. An oil pressure control system according to claim 3, wherein said clutches and brakes are operated by said line pressure, said line pressure being regulated by said line pressure regulating valve to be substantially different in three levels according to the shifting conditions of said plurality of shift valves and said manual shift valve, the line pressure in each one of said different levers being gradually modulated according to the level of said throttle pressure.

* * * * *